United States Patent Office
3,426,041
Patented Feb. 4, 1969

3,426,041
PROCESS FOR PRODUCING
TETRAOXYMETHYLENE
Yasuhiko Miyake, Fujisawa, Saburo Adachi, Yokohama, Norifumi Yamauchi and Toshio Hayashi, Zushi, and Masamichi Akimoto, Hiratsuka, Japan, assignors to Toyo Koatsu Industries, Inc., Chuo-ku, Japan, a corporation of Japan
No Drawing. Filed June 1, 1965, Ser. No. 460,532
U.S. Cl. 260—340                  21 Claims
Int. Cl. C07d 19/00

ABSTRACT OF THE DISCLOSURE

A process for producing tetraoxymethylene by heating stabilized polyoxymethylene in the presence of a catalyst selected from certain metal salts and organic acids.

---

This invention relates to processes for producing tetraoxymethylene which is the cyclic tetramer of formaldehyde.

H. Staudinger et al. discovered that tetraoxymethylene was a cyclic tetramer of formaldehyde having the following structural formula

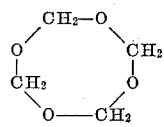

This fact is mentioned in Helv. Chim. Acta, 8, 48, 65 (1925) and Liebigs Ann., 474, 203–204 (1929). They obtained tetraoxymethylene at yield of about 5% by thermodecomposing a polyoxymethylene-diacetate of a high molecular weight. However, the mechanism of producing tetraoxymethylene has not yet been disclosed. In the Staudinger et al. process, tetraoxymethylene is not always produced and there are far more instances wherein tetraoxymethylene is not produced.

The mechanism of decomposing polyoxymethylene with acids and of producing trioxane and tetraoxymethylene is mentioned by W. Kern et al. in Makromol. Chem. 52, 48 (1962). It is reported that a polyoxymethylene is decomposed into tetraoxymethylene and/or trioxane with a Lewis acid, inorganic acid or organic acid by an ion decomposing mechanism, which is a cation decomposing mechanism in the case of using an acid and is an anion decomposing mechanism in the case of using no catalyst. However, in such process by the ion decomposition of polyoxymethylene, as reported by them, the amount of production of tetraoxymethylene is so small as to provide maximum yields of only 1.2%. Needless to say, such a process can hardly be industrially utilized.

We have first studied these facts and have clarified them as follows. When polyoxymethylene-diacetate is thermodecomposed, various types of decomposition occur. However, in order that tetraoxymethylene may be produced, there must occur such decomposition that the long-chain of the polyoxymethylene is cut in the middle. We have discovered that, with only thermodecomposition (no catalyst, no tetraoxymethylene is produced from such a polyoxymethylene-diacetate which is refined by sufficient washing with an organic solvent. The polyoxymethylene-diacetate from which Staudinger et al. obtained tetraoxymethylene is considered to have contained a slight amount of some impurity having such catalytic action so as to cut the polyoxymethylene chain in the middle as described above. The perfectly refined or pure polyoxymethylene-diacetate is so stable against heat as to produce no tetraoxymethylene. Tetraoxymethylene is produced even from a slightly insufficiently refined polyoxymethylene-diacetate when such impurities as accelerate the decomposition, as mentioned above, are contained by it.

From these facts, it has been found that, if a catalyst having such action as to cut a polyoxymethylene chain in the middle is added to the polyoxymethylene-diacetate, tetraoxymethylene is always produced. Therefore, it is a very reliable method to add a Lewis acid, organic acid or inorganic acid having an action of cutting a polyoxymethylene chain in the middle as reported by Kern et al.

However, we have further discovered the following facts. There are various types of decomposition of polyoxymethylene. Most of them are decompositions wherein a polyoxymethylene chain is cut in the middle as described above and decompositions wherein formaldehyde monomers are removed one by one from the terminal portions of polyoxymethylene. It has been found that, of these two types of decomposition, the former type of decomposition is desirable but the latter type of decomposition is not desirable in producing tetraoxymethylene. That is to say, tetraoxymethylene consists of four formaldehyde units and therefore it is only when a polyoxymethylene chain is cut every four formaldehyde units that tetraoxymethylene is produced. Tetraoxymethylene is not produced by the reaction of four formaldehyde monomers.

A further problem is in the use of such decomposing catalyst as Lewis acids, organic acids or inorganic acids disclosed by Kern et al. Such acids are certainly excellent catalysts for cutting a polyoxymethylene chain in the middle but, at the same time, severely cause the decomposition of the polyoxymethylene molecule from the terminal portions thereof and release large quantities of formaldehyde monomer. To make matters worse, the decomposition by such acids is a reaction by a cationic mechanism wherein tetraoxymethylene ring readily opens and thus decomposes.

From the above facts, it has been found that, in the process carried out by Kern et al., the undesirable decomposition of the terminal portions of the polyoxymethylene releasing formaldehyde monomer is caused and further, since the acids operate by a cationic decomposing mechanism, the already produced tetraoxymethylene is partly destroyed. In this respect, the process of Staudinger et al. is reasonable in acetylating the terminal radical of polyoxymethylene to prevent the above-mentioned undesirable decomposition. But no measures are taught or suggested to satisfy the other requirement of cutting the polyoxymethylene chain in the middle.

Simultaneously with the production of tetraoxymethylene, trioxane was considered to be also necessarily produced. When the polyoxymethylene chain is cut at intervals of four formaldehyde units, tetraoxymethylene is produced and, when it is cut at intervals of three formaldehyde units, trioxane is produced.

However, we have further discovered the following facts. That is to say, it has been found that trioxane is not produced at temperatures of about 120 to 130° C. or above and that the best temperatures for producing tetraoxymethylene are higher than about 140 to 150° C. Temperatures above 100° C. favor the production of tetraoxymethylene and discourage the production of trioxane. Although small amounts of trioxane may be produced at temperatures between 100° C. and 120 to 130° C., such amounts can be tolerable in some cases in producing tetraoxymethylene in accordance with this invention and temperatures between 100° C. and 140 to 150° C. can be used in obtaining the advantages of this invention. It has been found that, if a process is carried out wherein the polyoxymethylene chain is not decomposed but is kept as stable as possible below 120 to 130° C. and is decomposed only above 140 to 150° C., only tetraoxymethylene is obtained with no production of trioxane. In order that the polyoxymethylene chain may not be cut but may be kept stable until higher temperatures, e.g., above 140 to 150° C. are reached, a polyoxymethylene having stabilized terminal radicals should be used as the starting material. It is also preferable to select such catalysts as will not decompose a polyoxymethylene chain below 120 to 130° C. but will decompose it above 140 to 150° C. Temperatures as high as 300° C. or higher can be employed.

An object of the present invention is to establish an industrially useful process for producing tetraoxymethylene. From the above-described facts and theory disclosed by us, it has been found that, in order to produce tetraoxymethylene, the following four conditions are desirable:

(1) To use as the starting material, a polyoxymethylene having stabilized terminal radicals, (2) To decompose the polyoxymethylene at a temperature higher than 100° C., (3) To use a catalyst which cuts a polyoxymethylene chain in the middle, and/or (4) To quickly remove the produced tetraoxymethylene from the reaction system or from the presence of the decomposing catalyst.

In order to satisfy these four conditions the actual method of the present invention is illustrated as follows:

In satisfaction of condition (1), for the polyoxymethylene having its terminal radicals stabilized there can be used, for example, polyoxymethylenes having the terminal hydroxyl radicals thereof acylated, e.g., acetylated, alkylated or urethanated. Organic acids especially useful for the acylating are the lower alkyl carboxylic acids such as acetic, propionic and butyric acids. Lower alkanols, e.g., methanol, ethanol, propanol and butanol are especially useful in the alkylation. Isocyanates especially useful in urethanation are the single benzene nucleous aromatic isocyanates, e.g., phenyl isocyanate, tolyl isocyanate and the like, and the lower alkyl isocyanates, e.g., ethyl isocyanate, butyl isocyanate and the like. It is also effective in preventing the decomposition of the chain from the terminal portions thereof to use a starting material having a constituent other than combined formaldehyde in the polyoxymethylene chain, for example, copolymers of formaldehyde with a monomer such as ethylene oxide, 1,3-propylene oxide, 1,2-butylene oxide, butadiene oxide, 1,3-dioxolane, 1,3-dioxane, cyclic trimethylene oxide, tetrahydrofuran, cyclic pentamethylene oxide, paraldehyde and 1,3,5-trioxepane.

In satisfying the above-mentioned condition (3) there can be used a catalyst which does not decompose tetraoxymethylene ring but selectively only cuts the polyoxymethylene straight chains. However, no catalyst having such a character has been found. The best catalyst having a character comparatively closest to condition (3) is potassium persulfate. In order to satisfy the condition (3), not from the action of the catalyst but from operational standpoint, the method of the condition (4) is desirable. That is to say, produced tetraoxymethylene is quickly taken out of the reaction system in which the decomposing catalyst is present. For example, in one embodiment the decomposing reaction is carried out in a solid phase under a reduced pressure system, and produced tetraoxymethylene is quickly sublimated and removed. In another embodiment the decomposing reaction is carried out in a solid phase and an inert gas, which does not react with tetraoxymethylene or formaldehyde under the prevailing reaction conditions, is passed through the reaction system, whereby the produced tetraoxymethylene is quickly sublimated and taken out of the system by the inert gas.

In carrying out the method mentioned above, it is preferable that the vapor pressure of the catalyst be low. That is to say, it is not desirable for the catalyst to evaporate or sublime simultaneously with the sublimation of tetraoxymethylene. Further, the strength of the catalytic action is important. A catalyst which is too strong in the decomposing action is not desirable because the decomposition of polyoxymethylene from the terminal portions is increased and decomposition of the produced tetraoxymethylene begins. Thus, the yield is reduced and, in severe cases, tetraoxymethylene may not be produced at all. The sublimatability and vapor pressure of the catalyst can be easily known by measuring them. But the strength of the decomposing action cannot be defined by a strict rule. As reported by Kern et al., it is defined by the strength of the acidity or by the molecular structure, but neither of them is accurate in all cases.

However, by considering all these factors, desirable catalysts can be enumerated to be such salts of metals belonging to Group I-A of the Periodic Table as persulfates, bisulfates and pyrosulfates, for example, potassium persulfate, potassium bisulfate, potassium pyrosulfate, sodium persulfate, sodium bisulfate, sodium pyrosulfate, lithium persulfate; halogenides of metals belonging to Group II-B of the Periodic Table and copper (Group II), for example, zinc chloride, zinc bromide, cadminium chloride, cadminium bromide, mercury chloride and mercury bromide; sulfates of metals belonging to Groups III-B, IV-B, and V-B of the Periodic Table, for example, aluminum sulfate, stannous sulfate, lead sulfate, bismuth sulfate and antimony sulfate; secondary sulfates of metals belonging to Group VIII of the Periodic Table, for example, ferric sulfate and cobaltic sulfate; and such organic acids as picric acid, anthraquinone-beta-sulfonic acid, napththylaminesulfonic acid, m-cresol-sulfonphthalein and thymolsulfonphthalein. The Periodic Table referred to above can be found on p. 665 of Outlines of Physical Chemistry, by Farrington Daniels, published 1948 by John Wiley & Sons, Inc., New York, N.Y. It is noted that Groups III-B, IV-B and V-B referred to above are the same as Groups III-A, IV-A and V-A on page 401 of Handbook of Chemistry and Physics, 39th edition, 1957–1958, published by Chemical Rubber Publishing Co., Cleveland, Ohio.

Undesirable catalysts are, for example, sulfuric acid, phosphoric acid, ammonium persulfate, mono-potassium phosphate, di-potassium phosphate, aluminum chloride, sodium perborate tetrahydrate, ferric chloride, phosphorus pentoxide, cyanuric acid, succinic acid, citric acid, terephthalic acid, mono-potassium terephthalate and such organic radical series catalysts as dicumyl peroxide, benzoyl peroxide and azo-bisisobutyronitrile, calcium hydroxide and sodium carbonate. Further, in case an additive is used to accelerate the catalytic action of any desirable catalyst, the yield of tetraoxymethylene is reduced and therefore the use of such additives is not desirable, for example, as in the case of adding ferrous sulfate or sodium thiosulfate to potassium persulfate. Also the presence of oxygen is not preferred because of undesirable decomposition.

Picric acid is a desirable catalyst for the production of tetraoxymethylene. But, when it is heated to a very high temperature, it is likely to sublime. In using such catalysts as picric acid, therefore, it is desirable to adjust the pressure reduction used in the process by comparing the sublimatability of the catalyst with that of tetraoxymethylene, The object of the present invention is to decompose a polyoxymethylene, having the terminal radical stabilized, at a temperature higher than 100° C. under a reduced pressure, or in the presence of a moving stream of an inert gas, in the presence of such catalyst that cuts the polyoxymethylene chain in the middle at the chosen reaction temperature. In the present invention any one of the above-mentioned catalysts can be used or a mixture of two or more catalysts can be used also. The amount of the catalyst added to a stabilized polyoxymethylene can be varied according to its strength, and, if a strong catalyst is used, only small amounts thereof are needed. The amount of catalyst is also determined by the percentage of yield desired and the particular reaction conditions applied. Under these circumstances the catalyst can be present in amounts as low as 0.1% or lower and 25% or higher based on the weight of polyoxymethylene starting material.

The degree of reduction in pressure is not narrowly critical in the present invention. Although the detailed mechanism of the influences of reduced pressures on the production of tetraoxymethylene is not clearly understood, reduced pressures permit the quick removal of tetraoxymethylene from the reaction system by sublimation and collection thereof by cooling. The degree of a reduced pressure is selected by a consideration of vapor pressures and sublimatabilities of the catalyst used, as taught hereinabove. Illustratively, reduced pressures ranging from 5 mm. to 300 mm. Hg, preferably 5 to 50 mm. Hg, can be used with the above considerations in mind.

The inert gas which is used to remove the product from the reaction system can be nitrogen, carbon dioxide, methane, ethane, helium, argon, hydrogen, formaldehyde and the like. The quantity of inert gas used depends upon the above-mentioned reaction conditions, but, illustratively, an inert gas of 1 to 20 liters per hour per 100 gr. starting material can be used. The gas which is used in the reaction system is separated from the resulting product by cooling and then the gas is recycled into the reaction system. As pointed out above, reduced pressures aid in the sublimation of the product, as well as in the removal thereof; however, when employing a stream of inert gas to remove the product, the pressure of the system need not be reduced below 760 mm. Hg, although low pressures appear to be preferred in assisting in the removal of the product.

In the decomposition of polyoxymethylene by the process of the present invention, substantially all of the remaining by-products other than tetraoxymethylene are formaldehyde monomers which can be recovered and reused.

The principal advantage of the present invention is that no industrially usable process for producing tetraoxymethylene has been heretofore known. In heretofore known processes, while tetraoxymethylene is identified as produced thereby, the yield is very low. Processes under the present invention are capable of producing yields of tetraoxymethylene in excess of 20% and can be well adapted to industrial utilization.

Tetraoxymethylene is an excellent raw material for the manufacture of polyformaldehyde resins. That is to say, as compared with trioxane, the polymerization yield of tetraoxymethylene is substantially 100% and no operations for recovering unreacting substances are at all required.

Examples of the present invention are given in the following.

EXAMPLE 1

250 gr. of paraformaldehyde and 85 gr. of acetic anhydride were put into an autoclave made of stainless steel and were made to react at 160° C. for 20 hours. After the reaction, the contents were taken out, were separated by filtration, were washed with ether three times and with ethyl acetate once and were then dried at 40° C. under a reduced pressure. The amount of the thus-obtained polyoxymethylene-diacetate was 127 gr.

Finely powdered potassium persulfate in different amounts for different runs was added to 100 gr. per run of the above-mentioned polyoxymethylene diacetate which was reduced in size to less than that which passed a screen of 50 meshes per inch. The resulting mixture was thoroughly mixed and put into a flask provided with a stirrer. A long glass tube 1 m. long and 3 cm. in diameter was fixed to the outlet of the flask so as to slope downwardly somewhat from said outlet and at the free end thereof was connected to two cold traps connected in series and cooled to −50° C. The second of the two cold traps was connected to a vacuum pump through a pressure gauge. The long glass tube is used for collecting the sublimated product and could be well cooled with air but, as desired, water could be made to flow along the surface of the tube to facilitate cooling. The interior of the system was kept at 20 to 30 mm. Hg with the vacuum pump and the flask heated with an oil bath. The stirrer was slowly rotated at intervals. When the bath temperature reached 150 to 160° C., crystals of tetraoxymethylene began to deposit in the collecting tube. The crystals grow gradually until a large amount of fine needle-like crystals was deposited. The bath temperature was kept at 170 to 180° C. and the decomposition was completely finished in about 8 hours. The collecting tube was removed and the crystals deposited on the inner wall of the tube were scraped off. Substantially pure, dry tetraoxymethylene was thus obtaned. A small amount of crystals was also deposited in the first cold trap and was washed with acetone. Then the acetone was evaporated at room temperature and additional tetraoxymethylene was thus obtained. The total amounts of tetraoxymethylene obtained are indicated in the following Table I. The melting point of the crystals was 105 to 110° C. There was substantially no production of trioxane. The resulting tetraoxymethylene was recrystallized from carbon disulfide and had a melting point of 112° C.

TABLE I

| Run No. | Polyoxymethylene-diacetate in gr. | Amount of addition of the catalyst in gr. | Tetraoxymethylene obtained in gr. |
| --- | --- | --- | --- |
| 1 | 100 | 20.0 | 12.5 |
| 2 | 100 | 10.0 | 17.3 |
| 3 | 100 | 5.0 | 25.4 |
| 4 | 100 | 3.0 | 28.1 |
| 5 | 100 | 1.0 | 24.4 |
| 6 | 100 | 0.7 | 18.6 |
| 7 | 100 | 0.3 | 3.9 |

EXAMPLE 2

A polyoxymethylene-diacetate as produced in the manner described in Example 1 was decomposed in the same process as in Example 1 by employing the following catalysts. The amount of the catalysts and the degree of the pressure reduction at the time of the decomposition were varied from run to run. The results of the runs were as follows:

TABLE II

| Run No. | Polyoxymethylene-diacetate in gr. | Catalyst | Gr. | Decomposition pressure in mm. Hg | Tetraoxymethylene in gr. |
| --- | --- | --- | --- | --- | --- |
| 1 | 100 | $Na_2S_2O_8$ | 3.0 | 20 | 26.8 |
| 2 | 100 | $KHSO_4$ | 1.0 | 20 | 10.5 |
| 3 | 100 | $NaHSO_4$ | 1.0 | 20 | 12.5 |
| 4-1 | 20 | $K_2S_2O_7$ | 0.4 | 30 | 4.0 |
| 4-2 | 20 | $K_2S_2O_7$ | 0.1 | 30 | 5.0 |
| 4-3 | 20 | $K_2S_2O_7$ | 0.04 | 30 | 5.4 |
| 5 | 20 | $Na_2S_2O_7$ | 0.2 | 30 | 4.5 |
| 6 | 100 | $ZnCl_2$ | 1.0 | 30 | 11.6 |
| 7 | 50 | $ZnBr_2$ | 5 | 25 | 6.0 |
| 8 | 100 | $CuCl_2$ | 5 | 30 | 16.0 |
| 9 | 100 | $CdBr_2$ | 5 | 30 | 14.8 |
| 10-1 | 20 | $SnSO_4$ | 2.0 | 25 | 4.5 |
| 10-2 | 20 | $SnSO_4$ | 1.0 | 25 | 5.2 |
| 10-3 | 20 | $SnSO_4$ | 0.6 | 25 | 2.2 |
| 11-1 | 20 | $Bi_2(SO_4)_3$ | 0.2 | 25 | 2.8 |
| 11-2 | 20 | $Bi_2(SO_4)_3$ | 0.1 | 25 | 4.3 |
| 11-3 | 20 | $Bi_2(SO_4)_3$ | 0.05 | 25 | 1.8 |
| 12-1 | 20 | $Fe_2(SO_4)_3$ | 0.2 | 25 | 4.0 |
| 12-2 | 20 | $Fe_2(SO_4)_3$ | 0.1 | 25 | 5.0 |
| 12-3 | 20 | $Fe_2(SO_4)_3$ | 0.05 | 25 | 2.4 |
| 13 | 100 | Picric acid | 10 | 100 | 12.1 |
| 14-1 | 10 | Anthraquinon-β-sulfonic acid | 0.05 | 25 | 1.6 |
| 14-2 | 10 | ---do--- | 0.01 | 25 | 2.0 |
| 14-3 | 10 | ---do--- | 0.05 | 25 | 1.1 |
| 15 | 10 | m-Cresol-sulfonphthalein | 0.1 | 25 | 2.0 |

EXAMPLE 3

1 kg. of an aqueous solution of 37% formaldehyde containing 3.5% methanol was put into a flask provided with a stirrer, reflux condenser and thermometer and was kept at 20 to 25° C. 50 cc. of methanol were added thereto and 250 cc. of concentrated sulfuric acid were added drop-wise into the resulting mixture over a period of 2 hours. The mixture was left for one day while continuing the stirring even after the dropping. Thereafter, the precipitated production was separated by filtration, was soaked in an aqueous solution of 5% sodium sulfite, was again separated by filtration, was finally washed with water, and acetone, and was then dried at 40° C. under a reduced pressure. The amount of the polyoxymethylene-dimethylether thus obtained was 115 gr.

The thus-obtained polyoxymethylene-dimethyether was decomposed into tetraoxymethylene in the same process as described in Example 1 by employing the following catalysts. The results of these runs were as follows:

TABLE III

| Run No. | Polyoxymethylene-dimethylether in gr. | Catalyst Gr. | | Decomposition pressure in mm. Hg | Tetraoxymethylene in gr. |
|---|---|---|---|---|---|
| 2 | 100 | $K_2S_2O_8$ | 3.0 | 25 | 20.1 |
| 3 | 100 | $HgCl_2$ | 5.0 | 40 | 10.0 |
| 1-1 | 20 | $Al_2(SO_4)_3$ | 0.4 | 30 | 0.9 |
| 3-2 | 20 | $Al_2(SO_4)_3$ | 0.2 | 30 | 2.0 |
| 3-3 | 20 | $Al_2(SO_4)_3$ | 0.1 | 30 | 0.5 |
| 4 | 10 | Naphthylaminesulfonic acid. | 0.1 | 25 | 2.0 |

EXAMPLE 4

A slurry was prepared by putting 200 gr. of alpha-polyoxymethylene and 50 gr. of phenyl isocyanate into a flask containing 2 liters of dried cyclohexane and provided with a stirrer, reflux condenser and thermometer. The slurry was heated to 60 to 70° C. and was made to react for 2 hours while being stirred. After the reaction, the slurry was separated by filtration, was washed with acetone and was dried at 40° C. under a reduced pressure. The amount of the thus-obtained polyoxymethylene-diphenyl urethane was 152 gr.

The thus-obtained polyoxymethylene-diphenyl urethane was decomposed into tetraoxymethylene in the same process as described in Example 1 by employing the following catalysts. The results of these runs were as follows:

TABLE IV

| Run No. | Polyoxymethylene-dimethylurethane in gr. | Catalyst Gr. | | Decomposition pressure in mm. Hg | Tetraoxymethylene in gr. |
|---|---|---|---|---|---|
| 1 | 100 | $K_2S_2O_8$ | 3.0 | 25 | 17.4 |
| 2 | 20 | $PbSO_4$ | 3.0 | 25 | 3.7 |
| 3 | 20 | $SbSO_4$ | 0.05 | 25 | 3.5 |
| 4 | 20 | $Co_2(SO_4)_3$ | 0.03 | 25 | 4.0 |
| 5 | 10 | Thymolsulfonphthalein. | 0.1 | 25 | 2.1 |

EXAMPLE 5

250 gr. of alpha-polyoxymethylene, 25 gr. of 1,3-dioxolane and 500 cc. of benzene with the addition of 0.5 cc. of $BF_3$ etherate were put into an autoclave lined with Teflon and were made to react at 120° C. for 7 hours. After the reaction, the contents were taken out and the solid was separated, was well washed with acetone and was dried at 40° C. under a reduced pressure. The amount of the thus-obtained polyoxymethylene dioxolane copolymer was 108 gr.

3 gr. of finely powdered potassium persulfate were added to 100 gr. of the above-mentioned copolymer reduced in size to pass a screen of about 50 meshes per inch and the mixture was well mixed. When the mixture was decomposed in the same process as described in Example 1, 13.6 gr. of tetraoxymethylene were obtained.

EXAMPLE 6

100 gr. of polyoxymethylene-diacetate produced in the manner described in Example 1 and 3 gr. of potassium persulfate were added to the flask described in Example 1 and nitrogen was passed through the flask at a velocity of 5 liters per hour. The decomposition reaction was carried out at a temperature of 160° C. for 8 hours. In this manner 27.1 gr. of tetraoxymethylene was obtained in the collecting tube by cooling it.

In addition to the specific catalysts used in the above example, Example 1 was repeated using each of the remaining specific catalysts from the class consisting of the persulfate, bisulfate and pyrosulfate salts of the Group I–A metals, the halogenides of the Group II–B metals; sulfate salts of the metals of Groups II–B, IV–B and V–B; and the organic acids of picric acid, anthraquinone beta-sulfonic acid, naphthylaminesulfonic acid, m-cresolsulfonphthalein and thymolsulfonphthalein; and secondary sulfate salts of Group VIII metals, and tetraoxymethylene was produced in high yield when each of said remaining catalysts was employed in place of potassium persulfate in Example 1. Also, other polyoxymethylenes stabilized at the terminal portions thereof were used in place of the diacetate in Example 1 and resulted in the production of high yields of tetraoxymethylene. Such other stabilized polyoxymethylenes included the separate reaction products of polyoxymethylene and propionic acid, i.e., the dipropionates; butyric acid, i.e., the dibutyrates; ethanol, i.e., the diethyl ether; propanol, i.e., the dipropyl ether; butanol, i.e., the dibutyl ethers; tolyl isocyanate, i.e., the ditolyl urethane; butyl isocyanate, i.e., the dibutyl isocyanate; the polyoxymethylene copolymers made by copolymerization of formaldehyde or a formaldehyde donor and ethylene oxide, 1,3-propylene oxide, 1,2-butylene oxide, butadiene oxide, 1,3-dioxane, cyclic trimethylene oxide, tetrahydrofuran, cyclic pentamethylene oxide, paraldehyde, and 1,3,5-trioxepane.

What is claimed is:

1. Method of producing tetraoxymethylene from stabilized polyoxymethylene comprising heating said polyoxymethylene in the solid state to a temperature range from 100° to 300° C. in the presence of a catalyst from the class consisting of the persulfate, bisulfate and pyrosulfate salts of the Group I–A metals; the halogenides of the Group II–B metals and copper; sulfate salts of metals of Groups III–B, IV–B and V–B; and the organic acids of picric acid, anthraquinone betal-sulfonic acid, naphthylaminesulfonic acid, m-cresolsulfonphthalein and thymolsulfonphthalein; and secondary sulfate salts of Group VIII metals to form tetraoxymethylene and subliming said tetraoxymethylene substantially as it is formed.

2. Method of producing tetraoxymethylene from stabilized polyoxymethylene comprising heating said polyoxymethylene in the solid state to a temperature range from 100° to 300° C. under a reduced pressure in the presence of a catalyst from the class consisting of the persulfate, bisulfate and pyrosulfate salts of the Group I–A metals; the halogenides of the Group II–B metals and copper; sulfate salts of metals of Groups III–B, IV–B and V–B; and the organic acids of picric acid, anthraquinone beta-sulfonic acid, naphthylaminesulfonic acid, m-cresolsulfonphthalein and thymolsulfonphthalein, and secondary sulfate salts of Group VIII metals to form tetraoxymethylene, said temperature and reduced pressure favoring sublimation of tetraoxymethylene but not of said catalyst, and subliming the formed tetroxymethylene and collecting same apart from said polyoxymethylene and catalyst.

3. Method claimed in claim 2 wherein said catalyst is potassium persulfate and said temperature is above 140° C.

4. Method claimed in claim 2 wherein said catalyst is potassium pyrosulfate and said temperature is above 140° C.

5. Method claimed in claim 2 wherein said catalyst is sodium persulfate and said temperature is above 140° C.

6. Method claimed in claim 2 wherein said catalyst is sodium pyrosulfate and said temperature is above 140° C.

7. Method claim in claim 2 wherein said catalyst is $SnSO_4$ and said temperature is above 140° C.

8. Method claimed in claim 2 wherein said catalyst is $Bi_2(SO_4)_3$ and said temperature is above 140° C.

9. Method claimed in claim 2 wherein said catalyst is $Fe_2(SO_4)_3$ and said temperature is above 140° C.

10. Method claimed in claim 2 wherein said catalyst is $Co_2(SO_4)_3$ and said temperature is above 140° C.

11. Method claimed in claim 2 wherein said catalyst is naphthylaminesulfonic acid and said temperature is above 140° C.

12. Method claim in claim 2 wherein said catalyst is thymolsulfonphthalein and said temperature is above 140° C.

13. Method claimed in claim 2 wherein said catalyst is anthraquinon-beta-sulfonic acid and said temperature is above 140° C.

14. Method claimed in claim 2 wherein said catalyst is m-cresolsulfonphthalein and said temperature is above 140° C.

15. Method claimed in claim 3 wherein said stabilized polyoxymethylene is polyoxymethylene-diacetate.

16. Method claimed in claim 3 wherein said stabilized polyoxymethylene is polyoxymethylene diether.

17. Method claimed in claim 3 wherein said stabilized polyoxymethylene is polyoxymethylene-diphenyl urethane.

18. Method claimed in claim 3 wherein said stabilized polyoxymethylene is polyoxymethylene-1,3-dioxolane copolymer.

19. Method claimed in claim 4 wherein said stabilized polyoxymethylene is polyoxymethylene-diacetate.

20. Method claimed in claim 5 wherein said stabilized polyoxymethylene is polyoxymethylene-diacetate.

21. Method claimed in claim 1 wherein said tetraoxymethylene is sublimed by contacting a stream of inert gas with the said polyoxymethylene being heated in the presence of said catalyst.

References Cited

Staudinger, Helv. Chim. Acta, vol. 8, (1925), pp. 65–67.

W. Kern et al., Makromolekulare Chemie, vol. 52, (1962), pp. 48–58.

NORMA S. MILESTONE, *Primary Examiner.*